United States Patent
Hickey et al.

(10) Patent No.: US 11,513,919 B2
(45) Date of Patent: Nov. 29, 2022

(54) SYSTEM AND METHOD OF GENERATING AUTOMATIC CHECKPOINTS OF A DISTRIBUTED FILE SYSTEM

(71) Applicant: EMC IP Holding Company LLC, Hopkinton, MA (US)

(72) Inventors: Charles Hickey, Aptos, CA (US); Murthy Mamidi, San Jose, CA (US); George Mathew, Belmont, CA (US); Sirisha Kapoor, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 345 days.

(21) Appl. No.: 16/730,351

(22) Filed: Dec. 30, 2019

(65) Prior Publication Data

US 2021/0200646 A1 Jul. 1, 2021

(51) Int. Cl.
*G06F 11/14* (2006.01)
*G06F 16/11* (2019.01)
*G06F 16/182* (2019.01)

(52) U.S. Cl.
CPC ...... *G06F 11/1469* (2013.01); *G06F 11/1451* (2013.01); *G06F 16/125* (2019.01); *G06F 16/128* (2019.01); *G06F 16/182* (2019.01); *G06F 2201/84* (2013.01)

(58) Field of Classification Search
CPC ............ G06F 11/1469; G06F 11/1451; G06F 16/186; G06F 16/125; G06F 16/128; G06F 2201/84
See application file for complete search history.

(56) References Cited

U.S. PATENT DOCUMENTS

| | | | |
|---|---|---|---|
| 7,873,601 B1* | 1/2011 | Kushwah | G06F 11/1451 707/654 |
| 9,767,106 B1* | 9/2017 | Duggal | G06F 11/14 |
| 9,898,369 B1* | 2/2018 | Moghe | G06F 16/128 |
| 2011/0082836 A1* | 4/2011 | Wang | G06F 16/184 707/649 |
| 2013/0111262 A1* | 5/2013 | Taylor | G06F 11/2089 714/4.11 |
| 2014/0250080 A1* | 9/2014 | Gardner | G06F 11/1446 707/646 |
| 2015/0142745 A1* | 5/2015 | Tekade | G06F 11/1464 707/646 |
| 2017/0344430 A1* | 11/2017 | Greer | G06F 11/1456 |

* cited by examiner

*Primary Examiner* — Alford W Kindred
*Assistant Examiner* — Tiffany Thuy Bui
(74) *Attorney, Agent, or Firm* — Womble Bond Dickinson (US) LLP

(57) ABSTRACT

Disclosed herein are techniques for generating fractional checkpoints on a distributed file system by snapshotting subcomponents referred to as "file sets." The techniques include capturing a present time; calculating from configured parameters a future wakeup time for a subsequent set of checkpoints from the present time; walking a database of meta file set objects to locate at least one meta file set object; calculating a retention period for a snapshot that is being created; and generating a global data-less snapshot for the meta file set object and remote data file set objects associated with the meta file set object, and then repeating the process for subsequent file set objects in the database.

17 Claims, 5 Drawing Sheets

SYSTEM AND METHOD OF GENERATING AUTOMATIC CHECKPOINTS OF A DISTRIBUTED FILE SYSTEM

FIELD OF THE INVENTION

Embodiments of the present invention relate generally to data distributed filesystems. More particularly, embodiments of the invention relate to data recovery in distributed filesystems.

BACKGROUND

All computer systems are subject to crashes and potential loss of data. Various methods exist to mitigate this loss by taking periodic checkpoints of their current state. Recovery from an accident of some sort then involves rolling back to an earlier checkpoint, and then resuming operation.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
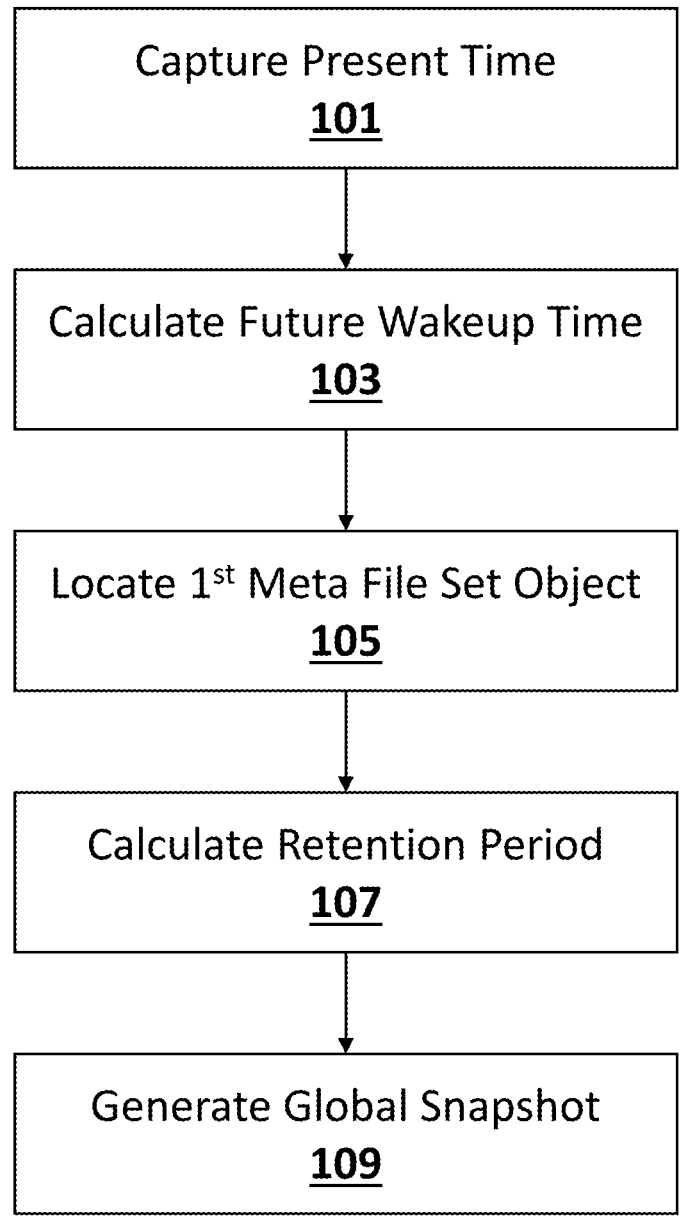
FIG. 1 is a flow diagram of an example global snapshot process, according to an embodiment.

As used herein, the term "distributed filesystem" describes a filesystem that runs on multiple computers, systems, or virtual machines, which are referred to herein as nodes. The distributed filesystem presents the user with a single system view of their data while allowing these nodes to work together as a team for increased throughput and scalability.

As used herein, the term "spanning file set" describes a distinct self-contained sub-filesystem inside the distributed filesystem that can be separately created, destroyed, and accessed without affecting other spanning file sets that may exist on the distributed filesystem. Each spanning file set includes a single meta file set object and zero or more data file set objects.

As used herein, the term "meta file set object" describes a data structure that houses the name space of a spanning file set object, i.e. directory and file names.

As used herein, the term "data file set object" describes a data structure that houses the data associated with each file.

As used herein, the term "snapshot" describes an atomic operation that captures the state of a file set and assigns a unique snapshot ID specific to this operation. Snapshots are read-only and cannot be modified once taken.

As used herein, the term "dataless snapshot" describes a snapshot that protects only the B+ tree used for storing the file metadata without protecting the file data, that the file set may reference from space reclamation from garbage collection operations. These limitations make dataless snapshots space efficient.

As used herein, the term "garbage collection" describes a process of memory management that clears spaces of objects no longer in use.

As used herein, the term "global snapshot" describes a collection of individual meta file set and data file set objects taken at the same time after all state has been synchronized across a cluster, and incoming data has been paused or quiesced.

As used herein, the term "checksum" describes a way to summarize the contents of a block of a file and to detect changes that might be due to corruption. Checksums are maintained on all the individual files, and a master checksum is created which summarizes all those checksums for a given file set.

As used herein, the term "root name space file object" is the container user to hold the database of meta file set objects and data file set objects located on each given node. During recovery processing, the root name space file object can be populated with recovered and/or rolled-back meta file set objects and/or data file set objects. If the root name space file object is itself corrupted a new one can created and populated with file set objects from the available information.

As used herein, the term "B+ tree" describes a data structure used to implement the root name space file, meta-file and data-file objects.

As used herein, the term "node" describes a device or basic unit of a data structure.

As discussed above, all computer systems are subject to crashes and potential loss of data. Most filesystems provide some mechanism to checkpoint their state and allow for rollback to a previous checkpoint or state. However, such mechanisms do not scale well across a number of computer nodes that are networked together into a cluster.

Checkpointing is a technique for improving resilience by providing points for which rollbacks can be performed. This may be needed in the case of a power outage, system failure, software bug, or user error. The more often a checkpoint is taken, the smaller the window is for data loss due to these error conditions. The lower the cost of the checkpoint, the more often it can be done and the smaller the window for data loss for a given cost.

One aspect of the present disclosure includes a computer implemented method of generating a global checkpoint. The method includes capturing a present time; calculating from configured parameters a future wakeup time for a subsequent set of snapshots from the present time; walking a database of meta file set objects to locate at least one of a plurality of meta file set objects; calculating a retention period for a snapshot that is being created; and generating a global data-less snapshot for the meta file set object and remote data file set objects associated with the meta file set object. In some embodiments, the remote data file set objects associated with the meta file set object span two or more nodes. In some embodiments, the method also includes performing an incremental distributed recovery on only a subset of the two or more nodes spanned by the remote data file set objects. In some embodiments, the method also includes saving node location information for the meta file set object where the global data-less snapshot originated. In some embodiments, the method also includes saving node location information for each data file set object that has also participated in the global data-less snapshot. In some embodiments, the method also includes saving a status of whether a file set being snapshotted is a meta file set object or a data file set object. In some embodiments, the method also includes saving a master file checksum for the meta file set object and data file set objects. In some embodiments, the method also includes editing a root namespace objects list of data file set objects to install a previous snapshot.

Another aspect of the present disclosure includes a system for generating a global checkpoint. The system includes a computer processing device; and a global snapshot module stored within the computer processing device. The global snapshot module captures a present time; calculates from configured parameters a future wakeup time for a subsequent set of snapshots from the present time; walks a database of meta file set objects to locate at least one of a plurality of meta file set objects; calculates a retention period for a snapshot that is being created; and generates a global data-less snapshot for the meta file set object and remote data file set objects associated with the meta file set object. In some embodiments, the remote data file set objects associated with the meta file set object span two or more nodes. In some embodiments, the system also includes a filesystem recovery module configured to perform an incremental distributed recovery on only a subset of the two or more nodes spanned by the remote data file set objects. In some embodiments, the recovery module is also configured to save node location information for the meta file set object where the global data-less snapshot originated. In some embodiments, the recovery module is also configured to save node location information for each data file set object that has also participated in the global data-less snapshot. In some embodiments, the recovery module is also configured to save a status of whether a file set being snapshotted is a meta file set object or a data file set object. In some embodiments, the recovery module is also configured to save a master file checksum for the meta file set object and data file set objects. In some embodiments, the recovery module is also configured to edit a root namespace objects list of data file set objects to install a previous snapshot.

Another aspect of the present disclosure includes a non-transitory computer-readable medium storing instructions which, when executed by one or more processors, cause the one or more processors to perform a global snapshot operation. The global snapshot operation includes capturing a present time; calculating from configured parameters a future wakeup time for a subsequent set of snapshots from the present time; walking a database of meta file set objects to locate at least one of a plurality of meta file set objects; calculating a retention period for a snapshot that is being created; and generating a global data-less snapshot for the meta file set object and remote data file set objects associated with the meta file set object. In some embodiments, remote data file set objects associated with the meta file set object span two or more nodes. In some embodiments, the instructions further cause the processing device to perform an incremental distributed recovery on only a subset of the two or more nodes spanned by the remote data file set objects. In some embodiments, the instructions further cause the processing device to edit a root namespace objects list of data file set objects to install a previous snapshot.

In some embodiments, a distributed filesystem can run on multiple computers, systems, or virtual machines, which are referred to herein as nodes. The distributed file set can include spanning file sets, which are each distinct self-contained sub-filesystems inside the distributed filesystem that can be separately created, destroyed or accessed without affecting each other. Each spanning file set can include a meta file set object, as well as data file set objects. An example distributed filesystem is discussed in more detail below in reference to FIG. 4.

Creating a distributed checkpoint efficiently on a large distributed filesystem presents a number of distinct problems. One such problem is that it is impractical to take a single synchronized checkpoint that encompasses all the nodes in a large distributed filesystem, because the amount of data generated, and the downtime incurred during this operation, is significant. Another problem is that performing independent but unsynchronized checkpoints on each node separately will make rolling back the state between nodes practically impossible because they will each represent the state of things at different points in time.

In one embodiment of the present disclosure, provides for taking a single point in time checkpoint across multiple nodes on a subcomponent of a distributed filesystem, which is referred to herein as a "spanning file set." Because spanning file sets are small, they can be more readily checkpointed. Since they are all taken at the same point in time, they can be readily stitched back together to restore the filesystem to correct operation.

In one embodiment, a distributed filesystem can be spread over one or more computer systems or virtual machines, which can be referred to as nodes. The filesystem is further divided into one or more spanning file sets, that themselves are composed of a single meta file set object and zero or more data file set objects. The snapshot and recovery system described herein is on a per-file set basis, as opposed to a per-node or per-filesystem basis.

In one embodiment, snapshots are used to provide an atomic capture of the state of a spanning file set at a given point in time, and to serve as checkpoints for the recovery mechanism. Dataless snapshots are used because they have a minimal impact on space resources. To support checkpointing of distributed filesystems, these dataless snapshots are performed globally across all of a given spanning file set's meta-file and data-file objects. A mechanism that provides for regular periodic collection of these snapshots is implemented, that includes a dedicated thread of execution and control structures to regulate its timing and operation.

In order to be able to use spanning file set snapshots for recovery purposes, extensive logging may be performed in order to contain the information needed to reassemble the collection of snapshots into a fully restored spanning file set. The actual rollback may utilize a dedicated tool or program, as described herein, that runs on each node with the requisite information to complete the recovery process. Once these tools have been run, the filesystem process can again be restarted on each node, and users can again start accessing data in its fully restored state.

The present disclosure further describes novel techniques for taking checkpoints, and recovery methods that allow restoration of filesystem state by stitching together component pieces. In some embodiments, the present disclosure includes an asynchronous thread that generates global data-less snapshots on a configurable and periodic basis. In some embodiments, the present disclosure includes snapshot event logging that provides information needed for recreating a spanning file set across a cluster. In some embodiments, the present disclosure includes an offline utility program to allow for reversion to an earlier global snapshot for rollback purposes. In some embodiments, the present disclosure also includes written procedures to allow for manual assembly and reversion of spanning file sets by a technician.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

FIG. 1 is a flow diagram of an example global snapshot process, according to an embodiment of the present disclosure. According to this example embodiment, an incremental distributed filesystem recovery can be performed on a sub-component of a spanning file set. Other systems use full distributed file system snapshots, or per-node recovery. The ability to incrementally recover a portion of the filesystem that is distributed has the advantage of being faster, simpler, and ultimately more reliable than other methods.

In operation 101, the present time is captured; and in operation 103 the future wakeup time for the next set of snapshots from the present time is calculated. In some embodiments, the future wakeup time is calculated from configured parameters.

In operation 105, the meta file set object to be snapshotted is located. In some embodiments, locating the meta file set object includes walking the database of meta file set objects in order to locate the one of interest.

In operation 107, the retention period for the snapshot that is being created is calculated. In some embodiments, the retention period can be controlled with the help of tunable parameters which can be changed as per needs. One example embodiment is to ensure that the snapshot is retained long enough for enumerating its name space before garbage collection (GC) runs and deletes any expired snapshots. According to this embodiment, one can estimate how long the enumeration of the B+ tree might take. This estimation may depend on the size of the B+ tree, which in turn depends on the number of files in the name space held in the B+ tree. In some embodiments, the GC timing can be tuned heuristically to double the interval at which the name space verification runs. In some embodiments, name space checkpointing can run every 24 hours, and the retention time thus lasts for 48 hours.

In operation 109, the global snapshot is created. In some embodiments, the new snapshot is a global dataless snapshot, as described above, for the meta file set object, as well as all its remote data file set object. In some embodiments, the remote data file set objects associated with the meta file set object can span two or more nodes. In some embodiments, the process also updates statistics and histograms on its operations, and then sleeps waiting for the next appointment time to run.

Figure 2:
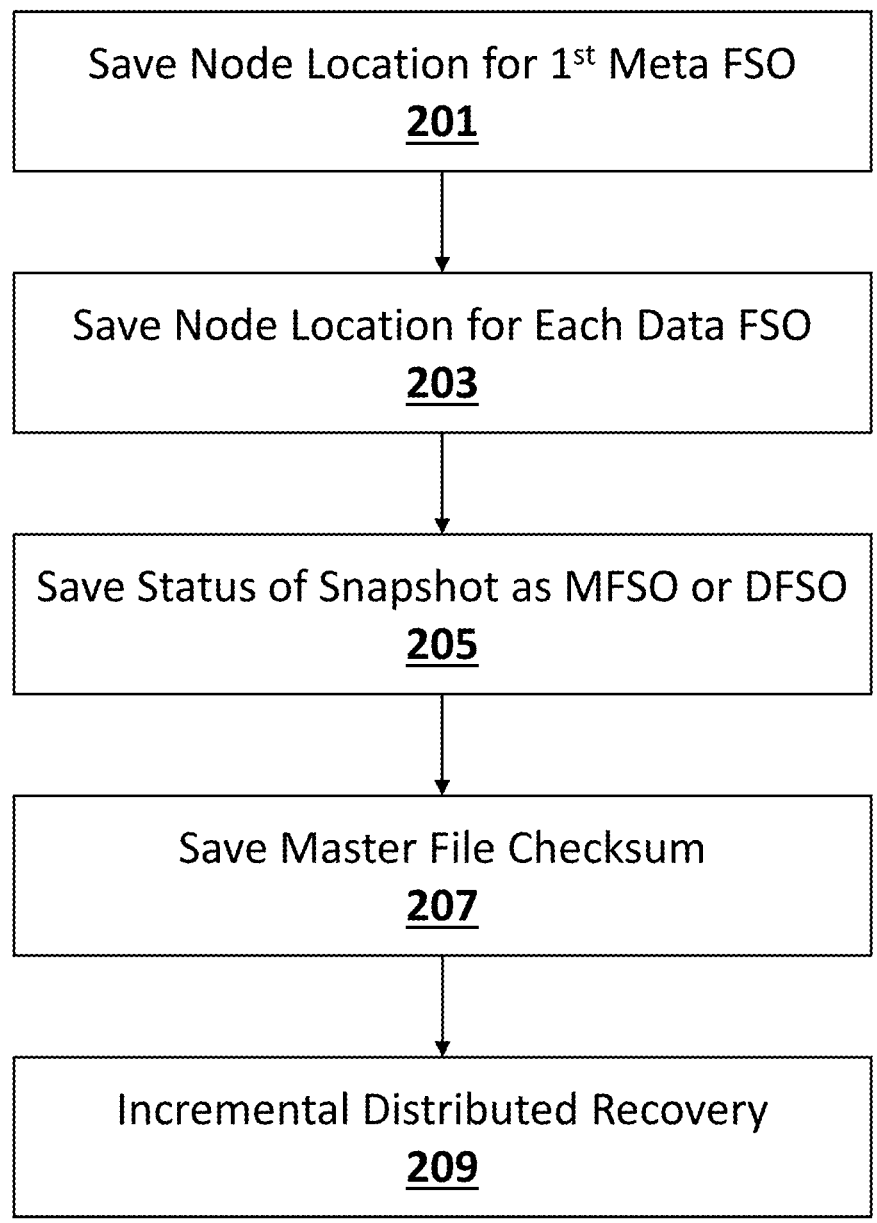
FIG. 2 is a flow diagram of another example global snapshot process, according to an embodiment.

FIG. 2 is a flow diagram of another example global snapshot process, according to an embodiment of the present disclosure. In some embodiments, a fair amount of additional information is saved on each snapshot to provide for spanning file set rollback in the event of a failure.

In operation 201, the node location for the meta file set object (FSO) where the global snapshot originated is saved. As discussed above, the meta file set object is a data structure that houses the name space of a spanning file set object.

In operation 203, the node location for each data file set object that has also participated in the global snapshot is saved. As discussed above, the data file set object is the data structure that houses the data associated with each file.

In operation 205, the status of whether the file set being snapshotted is a meta file set object or a data file set object is saved.

In operation 207, the master file checksum for the meta file set and the data file set objects is saved. As discussed above, a checksum summarizes the contents of a block of a file and to detect changes that might be due to corruption. Checksums are maintained on all the individual files, and the master checksum is created to summarize all those checksums for a given file set.

In operation 209, incremental recovery of the distributed filesystem can be performed. In some embodiments, the remote data file set objects associated with the meta file set object span two or more nodes, and the incremental distributed recovery is performed on only a subset of the nodes spanned by the remote data file set objects.

Figure 3:
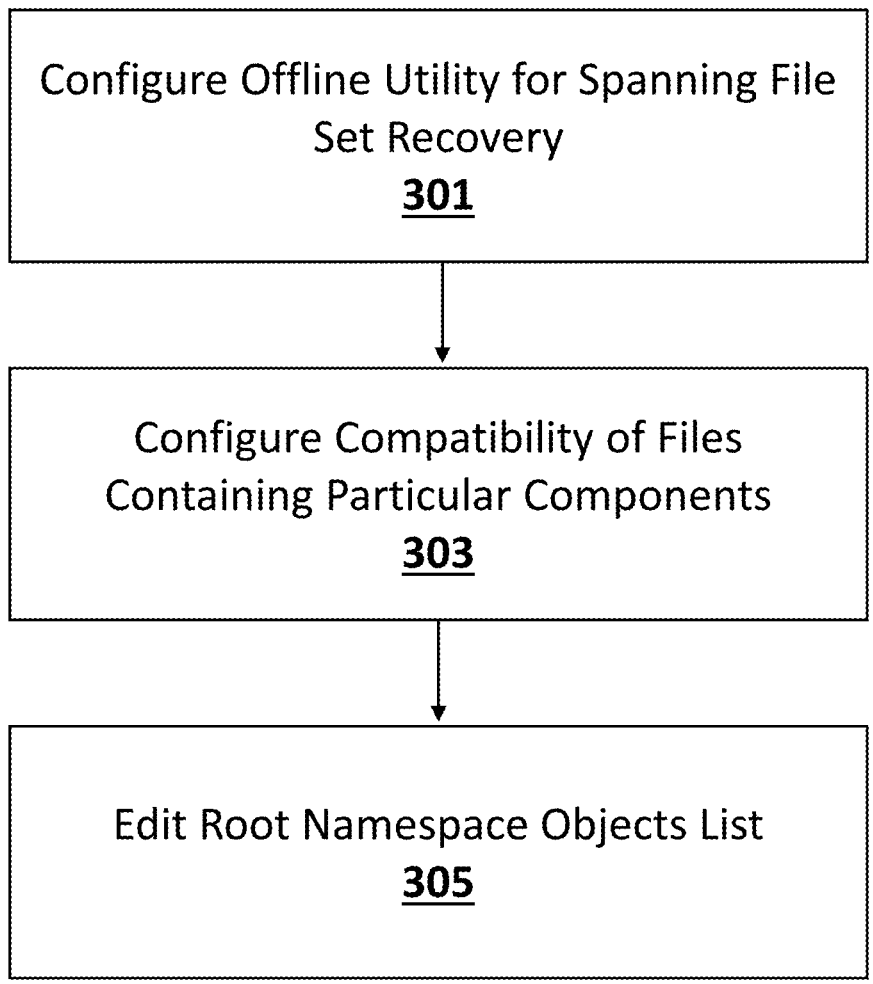
FIG. 3 is a flow diagram of another example global snapshot process, according to an embodiment.

FIG. 3 is a flow diagram of another example global snapshot process, according to an embodiment of the present disclosure. In some embodiments, an offline program is used for various file set tasks, and has been extended to perform global rollbacks of a spanning file set object.

In operation 301, offline utility is configured for spanning file set recovery. This offline utility program allows for reversion to an earlier global snapshot for rollback purposes.

In operation 303, an offline program is configured to allow for consumption of a file that contains particular components. In some embodiments, those components include a file set name, a file set ID, the node locations of the data file set objects, and the master checksum of the data file set object.

In operation 305, an offline program is configured to allow for editing of a root namespace objects list of data file set objects in order to set them to a proper value for an earlier era. In some embodiments, operation 305 is performed for rollback purposes.

Figure 4:
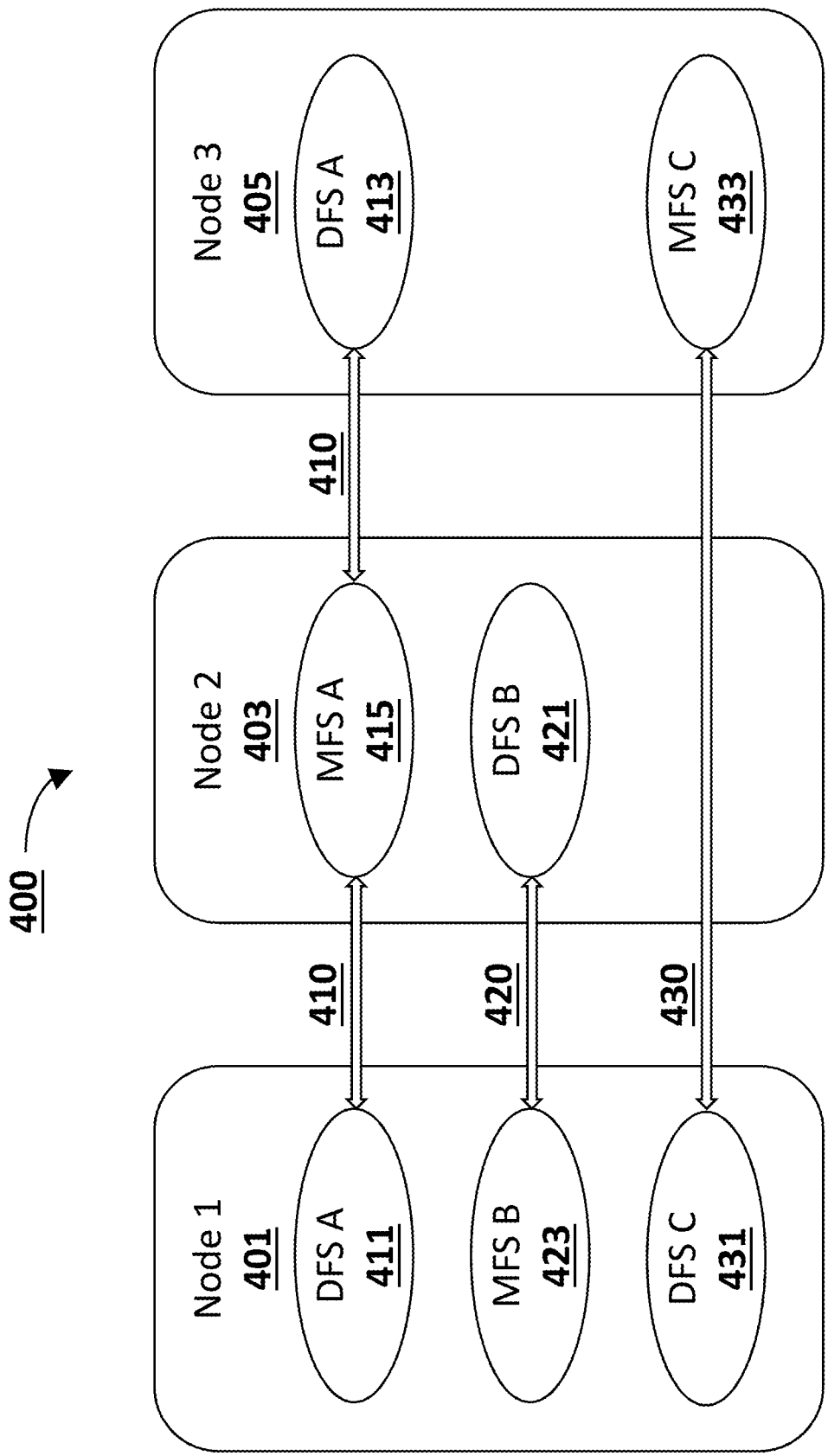
FIG. 4 is diagram of a distributed filesystem, according to an embodiment.

FIG. 4 is a block diagram illustrating a distributed filesystem 400, according to an embodiment of the present disclosure. The distributed filesystem 400 runs on multiple computers, systems, or virtual machines, which are referred to herein as nodes. In this example embodiment, those nodes include nodes 401, 403, and 405. The distributed file set includes three spanning file sets 410, 420, and 430, in this example diagram, which are each distinct self-contained sub-filesystems inside the distributed filesystem 400 that can be separately created, destroyed, and accessed without affecting each other.

Each spanning file set includes a single meta file set object and zero or more data file set objects. The first spanning file set 410 includes a meta file set (MFS) object A 415, and two data file set (DFS) objects 411 and 413 in this example diagram. The second spanning file set 420 includes a MFS object B 423 and a DFS object B 421. Similarly, the third spanning file set 430 includes a MFS object C 433 and a DFS object C 431.

As discussed above, each spanning file set 410, 420, and 430 can be independently accessed, upgraded, or restored without impacting the other spanning file sets. For example, a recovery can be performed on the second spanning file set 420 that will not impact node 3, 405 at all, since no portion of the second spanning file set 420 is located at node 3, 405.

In some embodiments, the distributed filesystem 400 may include any type of server or cluster of servers. The filesystem 400 may be implemented as part of an archive and/or backup storage system such as a deduplication storage system available from EMC® Corporation of Hopkinton, Mass. In deduplicated storage systems, multiple stored files or objects may contain and thus reference the same stored chunk of data. A chunk of data within a deduplication storage system may be referred to as a data segment. Fingerprints and other metadata are generated and maintained for stored segments of data and the segment of data is stored only once. The metadata associated with the segments are used to link the stored segments with files or objects.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
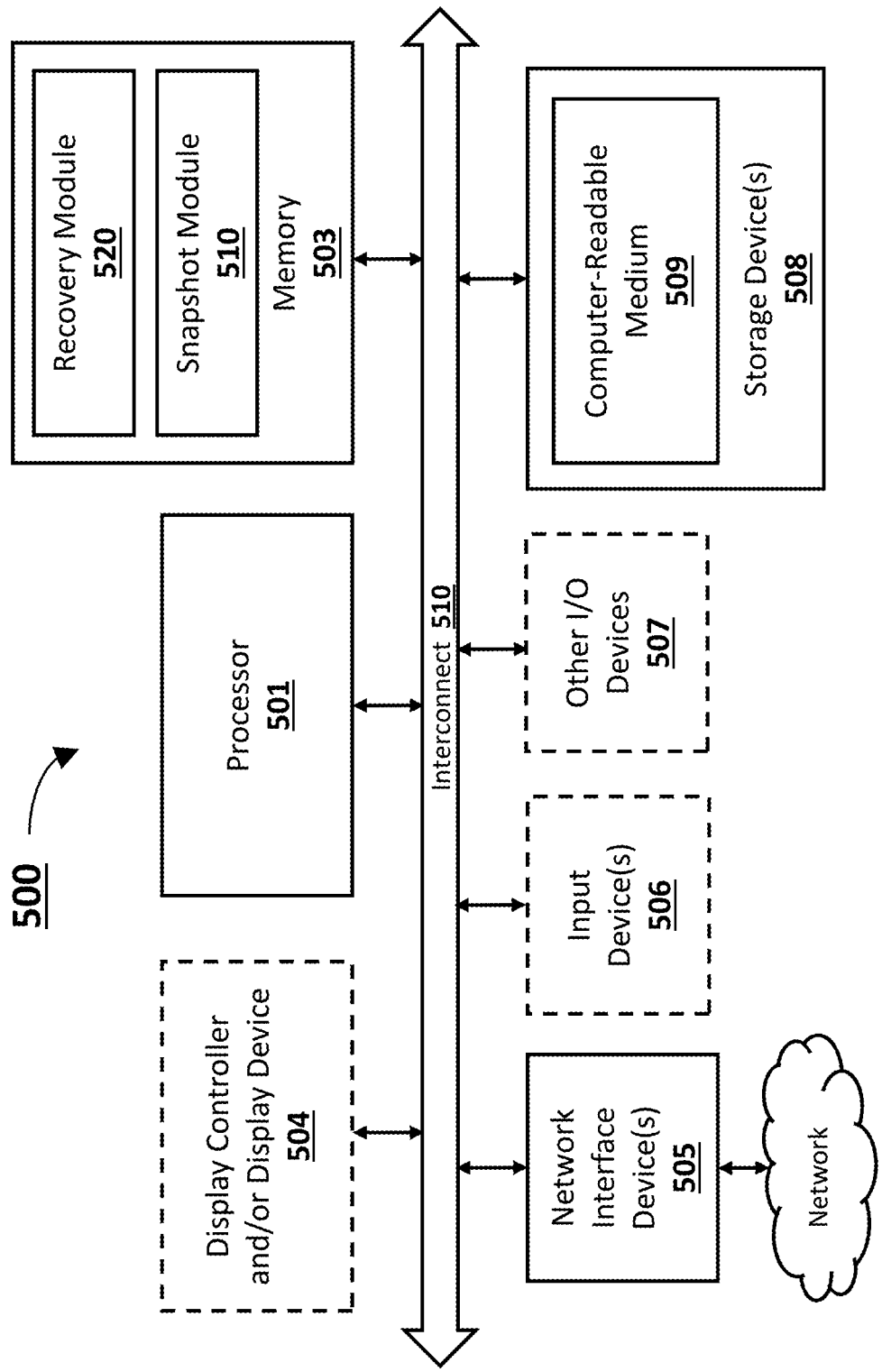
FIG. 5 is a block diagram illustrating an example of a data processing system that may be used with embodiments described herein.

FIG. 5 is a block diagram illustrating an example of a data processing system 500 that may be used with embodiments described herein. The data processing system 500 may represent any of the data processing systems described above and may perform any of the processes or methods described above. The data processing system 500 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 500 is intended to show a high-level view of many components of the computer system. However, it is to be understood that additional components may be present in certain implementations and furthermore, different arrangement of the components shown may occur in other implementations. The data processing system 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 500 includes one or more processor(s) 501, memory 503, network interface devices, 505, I/O devices, 506, 507 and storage device(s) 508 connected via a bus or an interconnect 510. In some embodiments, the memory 503 can store one or more modules, such as the snapshot module 510 and the recovery module 520, that can implement one or more of the processes or methods described herein. The one or more processor(s) 501 may be a single processor or multiple processors with a single processor core or multiple processor cores included therein. The processor(s) 501 may represent one or more general-purpose processors such as a microprocessor, a central processing unit (CPU), or the like. More particularly, the processor(s) 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 501 may be a low power multi-core processor, such as an ultra-low voltage processor, and may act as a main processing unit and central hub for communication with the various components of the system. Such processor can be implemented as a system on chip (SoC). The processor(s) 501 are configured to execute instructions for performing the operations and steps discussed herein. The data processing system 500 may further include a graphics/display subsystem 504, which may include a display controller, a graphics processor, and/or a display device. In one embodiment at least a portion of the graphics/display subsystem 504 is integrated into the processors(s) 501. The graphics/display subsystem 504 is optional and some embodiments may not include one or more components of the graphics/display subsystem 504.

The processor(s) 501 communicates with memory 503, which in one embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the one or more processor(s) 501 or any other device. For example, executable code and/or data of a variety of operating systems, device drivers, firmware (e.g., input output basic system or BIOS), and/or applications can be loaded in the memory 503 and executed by one of the processor(s) 501. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 500 may further include I/O devices such as a network interface device(s) 505, input device(s) 506, and other I/O device(s) 507. Some of the input device(s) 506 and other I/O device(s) 507 may be optional and are excluded in some embodiments. The network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 506 may include a mouse, a touch pad, a touch sensitive screen (which may be integrated with a display device of the graphics/display subsystem 504), a pointer device such as a stylus, and/or a keyboard (e.g., physical keyboard or a virtual keyboard displayed as part of a touch sensitive screen). For example, the input device(s) 506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 507 may also include an audio device. An audio device may include a speaker and/or a microphone to facilitate voice-enabled functions, such as voice recognition, voice replication, digital recording, and/or telephony functions. The other I/O device(s) 507 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of data processing system 500.

To provide for persistent storage of information such as data, applications, one or more operating systems and so forth, a mass storage (not shown) may also couple to the processor(s) 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 501, e.g., via a serial peripheral interface (SPI). This flash device may provide for non-volatile storage of system software, including a basic input/output software (BIOS) as well as other firmware of the system.

The storage device(s) 508 may include computer-readable storage medium 509 (also known as a machine-readable storage medium) on which is stored one or more sets of instructions or software embodying any one or more of the methodologies or functions described herein. The computer-readable storage medium 509 may also be used to store the same software functionalities described above persistently. While the computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 500 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer implemented method of generating a global checkpoint, the method comprising:
    capturing a present time;
    calculating from configured parameters a future wakeup time for a subsequent set of snapshots from the present time;
    walking a database of meta file set objects to locate at least one meta file set object of a plurality of meta file set objects;
    calculating a retention period for a snapshot that is being created; and
    generating a global data-less snapshot for the at least one meta file set object and remote data file set objects associated with the at least one meta file set object,
        wherein the at least one meta file set object describes a data structure that houses a name space of a spanning file set object describing a distinct sub-filesystem inside a distributed filesystem, and
        wherein the remote data file set objects include a data structure that houses data associated with a file of the at least one meta file set object and are associated with the at least one meta file set object spanning two or more nodes.

2. The computer implemented method as in claim 1, further comprising:
    performing an incremental distributed recovery on only a subset of the two or more nodes spanned by the remote data file set objects.

3. The computer implemented method as in claim 1, further comprising:
    saving node location information for the at least one meta file set object where the global data-less snapshot originated.

4. The computer implemented method as in claim 1, further comprising:
    saving node location information for each data file set object that has also participated in the global data-less snapshot.

5. The computer implemented method as in claim 1, further comprising:
    saving a status of whether a file set being snapshotted is a meta file set object or a data file set object.

6. The computer implemented method as in claim 1, further comprising:
    saving a master file checksum for the meta file set object and data file set objects.

7. The computer implemented method as in claim 1, further comprising:
    editing a root namespace objects list of data file set objects to install a previous snapshot.

8. A system for generating a global checkpoint comprising:
    a computer processing device; and
    a global snapshot module stored within the computer processing device which performs the following operations:
        capturing a present time;
        calculating from configured parameters a future wakeup time for a subsequent set of snapshots from the present time;
        walking a database of meta file set objects to locate at least one of a plurality of meta file set objects;
        calculating a retention period for a snapshot that is being created; and
        generating a global data-less snapshot for at least one meta file set object and remote data file set objects associated with the at least one meta file set object,
            wherein the at least one meta file set object describes a data structure that houses a name space of a spanning file set object describing a distinct sub-filesystem inside a distributed filesystem, and
            wherein the remote data file set objects include a data structure that houses data associated with a file of the at least one meta file set object and are associated with the at least one meta file set object spanning two or more nodes.

9. The system as in claim 8, further comprising:
    a filesystem recovery module configured to perform an incremental distributed recovery on only a subset of the two or more nodes spanned by the remote data file set objects.

10. The system as in claim 9, wherein the filesystem recovery module is further configured to save node location information for the at least one meta file set object where the global data-less snapshot originated.

11. The system as in claim 9, wherein the filesystem recovery module is further configured to save node location information for each data file set object that has also participated in the global data-less snapshot.

12. The system as in claim 9, wherein the filesystem recovery module is further configured to save a status of whether a file set being snapshotted is a meta file set object or a data file set object.

13. The system as in claim 9, wherein the filesystem recovery module is further configured to save a master file checksum for the meta file set object and data file set objects.

14. The system as in claim 9, wherein the filesystem recovery module is further configured to edit a root namespace objects list of data file set objects to install a previous snapshot.

15. A non-transitory computer-readable medium storing instructions which, when executed by one or more processors, cause the one or more processors to perform a global checkpoint operation, the operation comprising:
  capturing a present time;
  calculating from configured parameters a future wakeup time for a subsequent set of snapshots from the present time;
  walking a database of meta file set objects to locate at least one of a plurality of meta file set objects;
  calculating a retention period for a snapshot that is being created; and
  generating a global data-less snapshot for at least one meta file set object and remote data file set objects associated with the at least one meta file set object,
    wherein the at least one meta file set object describes a data structure that houses a name space of a spanning file set object describing a distinct sub-filesystem inside a distributed filesystem, and
    wherein the remote data file set objects include a data structure that houses data associated with a file of the at least one meta file set object and are associated with the at least one meta file set object spanning two or more nodes.

16. The non-transitory computer-readable medium as in claim 15, wherein the instructions further cause the one or more processors to:
  perform an incremental distributed recovery on only a subset of the two or more nodes spanned by the remote data file set objects.

17. The non-transitory computer-readable medium as in claim 15, wherein the instructions further cause the one or more processors to:
  edit a root namespace objects list of data file set objects to install a previous snapshot.

* * * * *

UNITED STATES PATENT AND TRADEMARK OFFICE
CERTIFICATE OF CORRECTION

| | | |
|---|---|---|
| PATENT NO. | : 11,513,919 B2 | Page 1 of 1 |
| APPLICATION NO. | : 16/730351 | |
| DATED | : November 29, 2022 | |
| INVENTOR(S) | : Charles Hickey et al. | |

It is certified that error appears in the above-identified patent and that said Letters Patent is hereby corrected as shown below:

On the Title Page

In item [72] next to the Inventors, at Line 4, delete "Sirisha Kapoor" and insert --Sirisha Kaipa--.

Signed and Sealed this
Ninth Day of April, 2024

*Katherine Kelly Vidal*

Katherine Kelly Vidal
*Director of the United States Patent and Trademark Office*